May 13, 1930.    S. O. WHITE    1,758,879
OILING MEANS FOR TRANSMISSIONS
Filed March 23, 1927    2 Sheets-Sheet 2
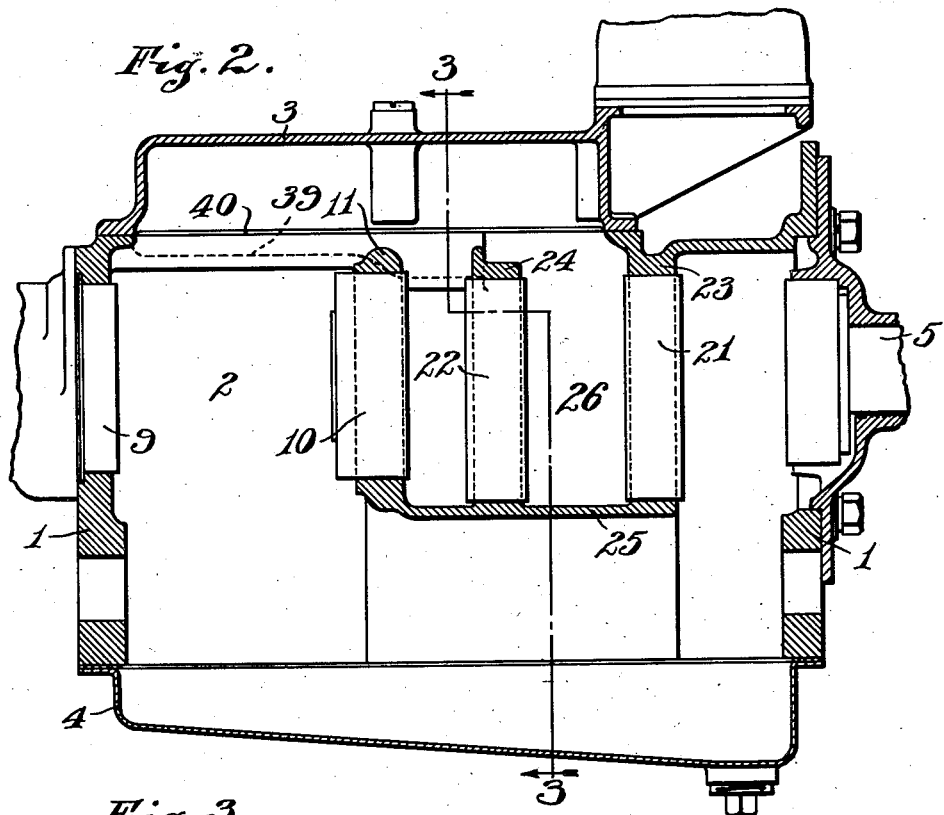
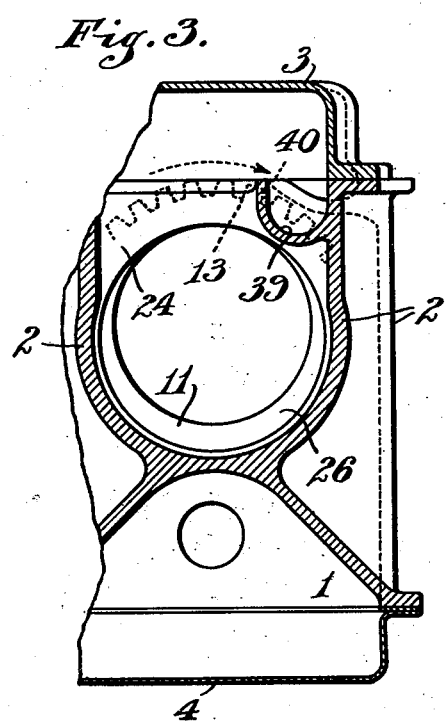
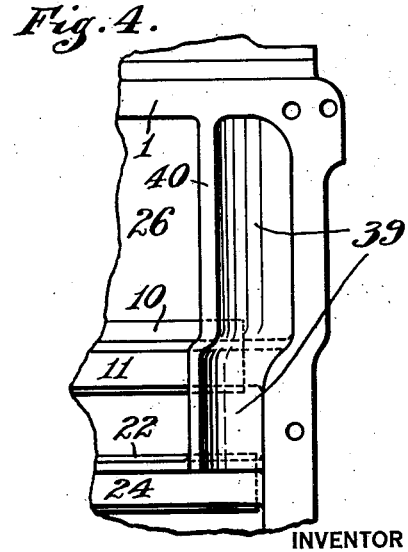
INVENTOR
Samuel O. White,
BY
Hood + Hahn.
ATTORNEYS Patented May 13, 1930

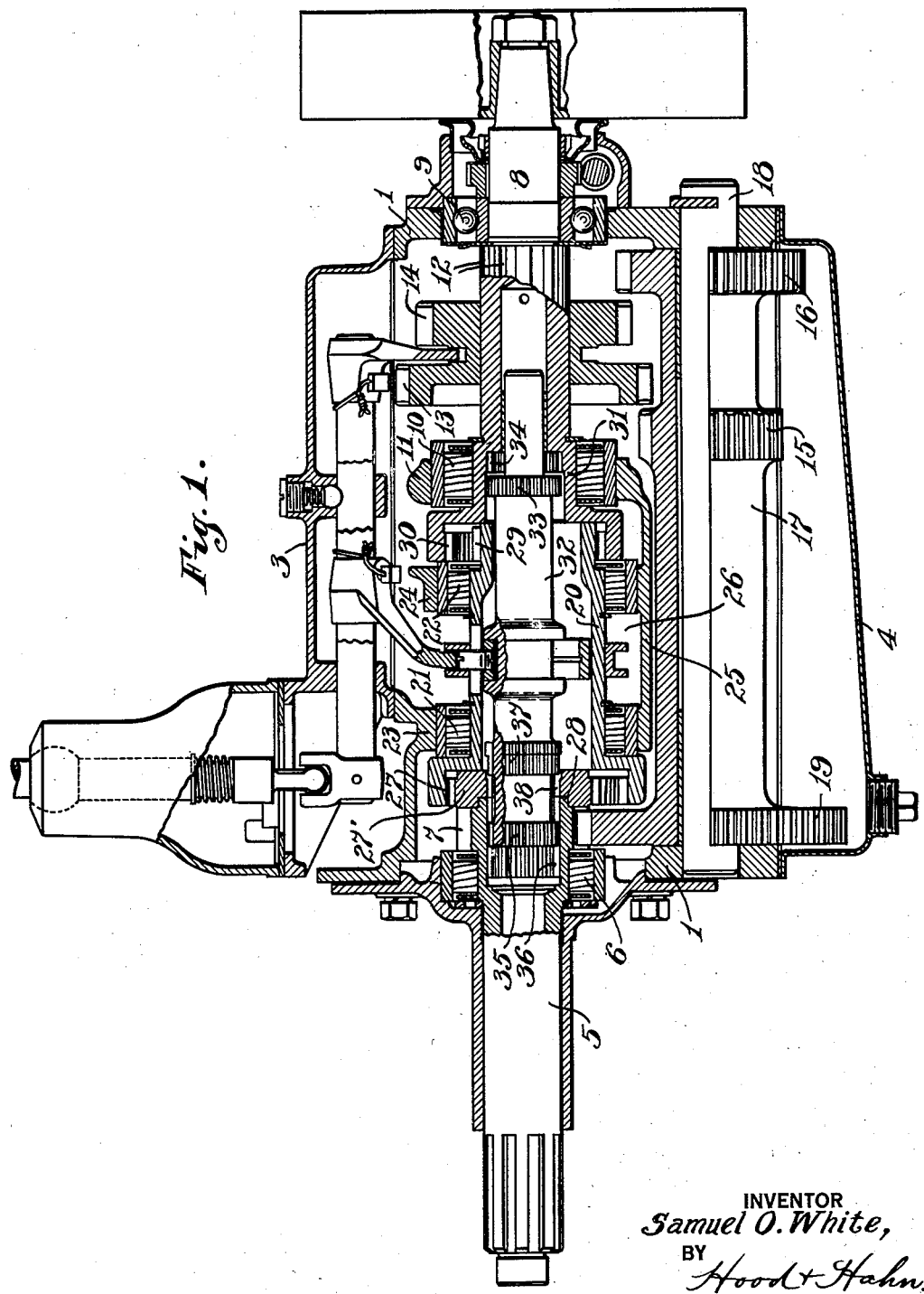

1,758,879

UNITED STATES PATENT OFFICE

SAMUEL O. WHITE, OF MUNCIE, INDIANA, ASSIGNOR TO WARNER GEAR COMPANY, OF MUNCIE, INDIANA, A CORPORATION OF INDIANA

OILING MEANS FOR TRANSMISSIONS

Application filed March 23, 1927. Serial No. 177,541.

My invention relates to improvements in transmissions for transmission gearing particularly adapted for automobiles and the like. My invention is designed primarily for use in connection with that type of transmission gearing wherein there is provided a number of bearings and transmission gears in substantial alinement with the openings in the casing through which the driven and drive shafts are adapted to pass.

It is one of the objects of my invention to provide means for lubricating the above bearings and gears which under ordinary circumstances will not receive sufficient lubricant.

For the purpose of disclosing my invention I have illustrated one embodiment thereof in the accompanying drawings in which Fig. 1 is a longitudinal section of an automobile transmission embodying my invention;

Fig. 2 is a longitudinal section of the transmission casing, the gearing being left out for the purpose of clearness;

Fig. 3 is a transverse section on the line 3—3 of Fig. 2, and

Fig. 4 is a detail plan with the top cover removed.

In the embodiment illustrated I provide a transmission casing having the usual end walls 1, 1 and side walls 2, 2. The casing is provided with the usual cover plates 3 removably bolted on the casing proper and in the present instance is provided with a removable bottom closure 4.

The driving shaft 5 is adapted to be connected with the engine or power unit through the usual clutch connection and extends into the casing and has its end journaled in suitable roller or ball bearings 6 mounted in the front wall of the casing. This driving shaft is provided at its inner end, and within the casing, with a driving gear 7. The driven shaft 8 also extends into the casing, being supported in a ball bearing 9 in the end wall of the casing, and at its forward end by a roller bearing 10 mounted in a bridge member or web 11 extending transversely of the casing from the two side walls. That portion of the shaft 8 extending into the casing is provided with splines as at 12 and has slidably mounted thereon a pair of speed-changing gears 13 and 14, the gear 13 being adapted for low speed and reverse drive and the gear 14 being adapted for second speed drive. These speed changing gears 13 and 14 are adapted to be slid into meshing engagement respectively with gears 15 and 16 rotatably with a sleeve 17 surrounding and mounted upon a shaft 18 extending through the lower portion of the end walls of the casing. Due to the fact that this shaft does not rotate, the sleeve 17 being adapted to rotate thereon, the shaft 18 may tightly fit the opening in the end walls. The opposite end of the sleeve 17 is provided with a gear 19 meshing with the gear 7 and driven therefrom. A hub 20 is arranged between the ends of the shafts 5 and 8 and is rotatably supported in a pair of roller bearings 21 and 22 mounted in transversely extending webs 23 and 24, which webs extend from the two sides of the casing. These webs and the web 11 are connected by a bottom 25 whereby a compartment 26 is formed within the casing, the purpose of which will appear more fully hereinafter. The hub 20 is adapted to rotate on an axis eccentric to the axes of rotation of the shafts 5 and 8 and at its forward end is provided with an internal gear 27 adapted to mesh with an external gear 27' rotatably mounted on a hollow extension 28 of the shaft 5. The opposite end of the hub is provided with an external gear 29 adapted to mesh with an internal gear 30 mounted on a hollow extension 31 of the shaft 8.

Extending between the two shafts 8 and 11 is a clutch shaft 32 which is longitudinally movable relatively to the two shafts 5 and 8 and at one end is provided with radial clutch teeth 33 adapted to mesh, when the shaft is moved to the right looking at Fig. 1, with internal teeth 34 formed in the hollow extension 31. The opposite end of this clutch shaft is provided with a set of clutch teeth 35 adapted to mesh with internal clutch teeth 36 formed in the interior of the hollow extension 28. A second set of teeth 37 is formed on the shaft 32 and these teeth, when the shaft is moved to the left, are adapted to mesh with internal teeth 38 formed on the gear 27' so that when the clutch shaft 32 is moved to the left the gear 27' will be locked to the shaft 5. The teeth 36 are wide enough so that when the shaft 32 is moved to the right to engage the clutch members 33 and 34 the clutch members 35 and 36 will still be in engagement though the clutch members 37 and 38 are out of engagement.

It will be noted that the webs 11 and 23, together with the connecting bottom 25 form a compartment in which the bearings 22 are mounted and in the end walls of which the bearings 10 and 21 are mounted. It will further be noted that the gears 29 and 30 rotate in this compartment. In order to supply this compartment with lubricating oil I provide a longitudinally extending trough 39 which projects into the compartment 26 and extends rearwardly to the rear wall of the casing. The inner edge 40 of this trough barely clears the path of rotation of the gear 13. As a result lubricating oil which is picked up by the gear 13 during its rotation is carried upward by said gear and deposited in the trough 39 and by said trough is conveyed to the compartment 26. There is a certain amount of leakage from the compartment 26 through the bearings 10 and 21 but this leakage is not as great as the supply delivered from the trough 39 so that the compartment 26 is kept, during the running of the car, practically filled with lubricating oil and the oil even may overflow the top of the web 11. Under these circumstances the hub 20 and the gears 29 and 30 are rotating in a bath of oil and this oil working in through the hub will thoroughly lubricate the clutch members 35, 36, 37 and 33 and 34 and, draining out of the hub through its forward end, will lubricate gears 27 and 27'.

Due to the fact that an oil level can not be maintained above the level of the openings for the shafts 5 and 8 in the casing it would be impossible to maintain an oil level sufficiently high in the transmission casing to lubricate the above mentioned parts. However, by the provision of the compartment 26 and using the gear 13 as an oil pump, this compartment 26 may be kept filled with lubricant to thoroughly lubricate the gear parts and at the same time there is no danger of leakage of the oil through the end walls of the transmission.

I claim as my invention:

1. In an automobile transmission the combination with a casing, of coaxial driving and driven shafts extending into said casing, an external gear on one of said shafts, an internal gear on the other shaft, a hollow eccentric gear member mounted between said gears and having sets of external and internal teeth in mesh with the internal and external gears respectively, a supplemental oil reservoir mounted with a plane normally above the oil level plane of said casing, the end walls of said reservoir supporting a bearing respectively for said gear member and one of said shafts, a transverse web in said reservoir intermediate of its ends and supporting a second bearing for said gear member, and a trough arranged in the upper part of said casing, adapted to deliver oil to said reservoir and to receive oil from a transmission gearing mounted on one of said shafts.

2. In an automobile transmission, the combination with a transmission casing having sides, top, bottom, and end members, the end members being provided with aligned openings, transversely extending webs between the side members connected at their bottoms by a longitudinal extending web to form a supplemental oil reservoir, the transversely extending webs having aligned openings therein and the bottom of said reservoir being above the normal oil level of the casing, bearings mounted in the end wall openings, aligned shafts extending into said casing and mounted in said bearings, of transmission gearing mounted in said supplemental reservoir and supported in bearings in the transverse webs, and means for supplying said supplemental reservoir with oil from the bottom of the casing.

3. In an automobile transmission, the combination with a transmission casing including side and end walls and top and bottom, the end walls having aligned openings therein, bearings mounted in said openings, transversely extending webs intermediate of the end walls of the casing having openings therein, bearings mounted in said openings, the bottoms of said walls being connected to form a supplemental oil reservoir, aligned shafts extending into said casing and supported in the end wall bearings, of transmission gearing mounted in said supplemental reservoir and supported in the bearings in the transverse webs, a counter-shaft mounted beneath said web and in said casing, gears mounted on said aligned shafts exterior of said supplemental reservoir, certain of said gears being arranged to elevate the oil in the bottom of the casing and deliver the same to said supplemental reservoir.

4. In an automobile transmission, the combination with a casing having sides, ends and a bottom, the ends being provided with shaft openings, transversely extending webs between the side members forming the end walls of a supplemental oil reservoir, a bottom closure member for said supplemental reservoir above the normal oil level of the casing, of transmission gearing mounted in said reservoir, and means for supplying said supplemental reservoir with oil from the bottom of the casing.

5. In an automobile transmission, the combination with a casing, having sides, ends and a bottom, the ends being provided with shaft openings, transversely extending webs between the side members having openings therein, and forming a supplemental oil reservoir, a bottom closure member for said oil reservoir above the normal oil level of the casing, bearings in said reservoir end wall openings, of transmission gearing mounted in said reservoir and supported in said bearings.

In witness whereof, I SAMUEL O. WHITE, have hereunto set my hand at Muncie, Indiana, this 18th day of March, A. D. one thousand nine hundred and twenty-seven.

SAMUEL O. WHITE.